US011836024B2

United States Patent
Olarig et al.

(10) Patent No.: US 11,836,024 B2
(45) Date of Patent: *Dec. 5, 2023

(54) SYSTEM METHOD FOR POWER DISTRIBUTION TO STORAGE DEVICES

(71) Applicant: Samsung Electronics Co., Ltd., Suwon-si (KR)

(72) Inventors: Sompong Paul Olarig, Pleasanton, CA (US); Matthew Shaun Bryson, Los Gatos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,382

(22) Filed: Mar. 17, 2022

(65) Prior Publication Data
US 2022/0206550 A1 Jun. 30, 2022

Related U.S. Application Data

(63) Continuation of application No. 16/828,839, filed on Mar. 24, 2020, now Pat. No. 11,281,273.

(60) Provisional application No. 62/976,269, filed on Feb. 13, 2020, provisional application No. 62/879,410, filed on Jul. 26, 2019.

(51) Int. Cl.
*G06F 1/26* (2006.01)
*G06F 13/16* (2006.01)

(52) U.S. Cl.
CPC .......... *G06F 1/266* (2013.01); *G06F 13/1668* (2013.01)

(58) Field of Classification Search
CPC .............................. G06F 1/266; G06F 13/1668
See application file for complete search history.

(56) References Cited

U.S. PATENT DOCUMENTS

| | | | |
|---|---|---|---|
| 8,301,918 B2 | 10/2012 | Diab et al. | |
| 9,760,141 B2 | 9/2017 | Sultenfuss et al. | |
| 9,811,489 B2 | 11/2017 | Suto | |
| 2005/0015525 A1 | 1/2005 | Cahill et al. | |
| 2005/0136989 A1* | 6/2005 | Dove | G06F 1/28 455/572 |
| 2009/0254768 A1* | 10/2009 | Livescu | G06F 1/3203 713/320 |
| 2010/0011229 A1* | 1/2010 | Davis | G11B 19/20 713/300 |
| 2010/0332860 A1* | 12/2010 | Trantham | G06F 1/263 713/300 |

(Continued)

OTHER PUBLICATIONS

SFF-TA-1009 Specification for Enterprise and Datacenter SSD Pin and Signal Specification Rev. 2.0 May 22, 2018, 24 pages.

(Continued)

*Primary Examiner* — Nimesh G Patel
(74) *Attorney, Agent, or Firm* — Lewis Roca Rothgerber Christie LLP

(57) ABSTRACT

A system and method for power distribution are disclosed. A processor detects a storage device having a scalable interface, where the scalable interface is for transferring data between a host device and the storage device. The processor determines power requirement of the storage device based on a signal from the scalable interface. At least one power supply unit coupled to the processor provides power to the storage device based on the determined power requirement.

20 Claims, 8 Drawing Sheets

(56) References Cited

U.S. PATENT DOCUMENTS

| | | |
|---|---|---|
| 2014/0181585 A1 | 6/2014 | Hoang et al. |
| 2016/0140041 A1 | 5/2016 | Niu et al. |
| 2020/0065273 A1 | 2/2020 | Bouda et al. |
| 2021/0194272 A1* | 6/2021 | Begino, III ............. H02M 1/36 |

OTHER PUBLICATIONS

SFF-TA-1008-SSD, PCI-SIG Developers Conference 2018, Copyright 2018, slide 14.

* cited by examiner

Power Table

| Presence Signal | Power (watts) |
|---|---|
| PRSNT[0]# | 25 |
| PRSNT[1]# | 35 |
| PRSNT[2]# | 70 |

FIG. 3

SYSTEM METHOD FOR POWER DISTRIBUTION TO STORAGE DEVICES

CROSS-REFERENCE TO RELATED APPLICATION(S)

This application is a continuation of U.S. patent application Ser. No. 16/828,839 filed Mar. 24, 2020, which claims priority to and the benefit of U.S. Provisional Application No. 62/976,269, filed Feb. 13, 2020, entitled "SYSTEM METHOD FOR PROVIDING DYNAMIC POWER ADJUSTMENT FOR SFF-TA-100X STORAGE DEVICES," and further claims priority to and the benefit of Provisional Patent Application No. 62/879,410, filed Jul. 26, 2019, the entire disclosure of each of which is incorporated by reference herein.

FIELD

One or more aspects of embodiments of the present disclosure relate to providing power to any connector-based storage devices, and more particularly, to distributing power efficiently based on a type of connector used by the storage devices.

BACKGROUND

Non-volatile memory (NVM) express (NVMe) can refer to a standard that defines a register-level interface for a host software to communicate with a non-volatile memory subsystem over a Peripheral Component Interconnect Express (PCIe) bus. An example of a non-volatile memory subsystem is a NVMe solid state drive (SSD).

NVMe Over Fabrics (NVME-oF) can refer to a standard that is used to transfer data between the host software and the non-volatile memory over a network such as Ethernet, Fibre Channel, or InfiniBand. A particular network-attached SSD, such as, for example, an Ethernet attached SSD (eSSD) may use the particular network (e.g. Ethernet) for the transfer of data.

SUMMARY

Embodiments of the present disclosure are directed to a method for power distribution. A processor detects a storage device having a scalable interface, where the scalable interface is for transferring data between a host device and the storage device. The processor determines power requirement of the storage device based on a signal from the scalable interface. At least one power supply unit coupled to the processor provides power to the storage device based on the determined power requirement.

According to one embodiment, the scalable interface is a small-form-factor-technology-affiliate-100X (SSF-TA-100X) connector, wherein X is an integer value selected from 2, 6, 7, or 8.

According to one embodiment, the storage device is at least one of a solid state drive (SDD) or a network-attached SSD.

According to one embodiment, the determining of the power requirement includes determining a type of signal from the scalable interface; and invoking a data structure for determining the power requirement based on the type of signal.

According to one embodiment, the data structure is a lookup table associating one or more signal types to corresponding power requirements.

According to one embodiment, the type of signal comprises at least one of a first presence signal, second presence signal, or third presence signal.

According to one embodiment, a first type of scalable interface associated with a first type of power requirement is configured to transmit the first presence signal, a second type of scalable interface associated with a second type of power requirement is configured to transmit the second presence signal, and a third type of scalable interface associated with a third type of power requirement is configured to transmit the third presence signal.

According to one embodiment, the first type of scalable interface includes four communication lanes and has a power requirement of about 25 W, the second type of scalable interface includes eight communication lanes and has a power requirement of about 35 W, and the third type of scalable interface includes sixteen communication lanes and has a power requirement of about 70 W.

According to one embodiment, the determining the type of signal includes determining a status of one or more pins of the scalable interface.

According to one embodiment, the at least one power supply unit includes first and second power supply units, and the providing of the power further includes: determining, by the processor, that power from the first power supply unit is less than the determined power requirement for the storage device; and activating, by the processor, in response to the determining, the second power supply unit for delivering power to the storage device.

Embodiments of the present disclosure are also directed to a power distribution system that includes a storage device having a scalable interface, the scalable interface for transferring data between a host device and the storage device; at least one power supply unit; and a processor coupled to the storage device and the at least one power supply unit. The processor is configured to: detect the storage device having a scalable interface; determine power requirement of the storage device based on a signal from the scalable interface; and signal the at least one power supply unit for delivering power to the storage device based on the determined power requirement.

As a person of skill in the art should recognize, embodiments of the present disclosure allow power to be distributed to a storage device based on a power requirement of the device. This provides an improvement over traditional power distribution mechanisms that over-provision power for maximum possible need. In addition, embodiments of the present disclosure allow a power supply unit to work efficiently by allowing the power distribution responsibility to be shared with one or more other power supply units based on need of the system. This is also an improvement to traditional power distribution mechanisms that rely on a single power supply unit to provision power for an entire system.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 3 is conceptual layout diagram of a system power table for distributing power to a storage device according to one exemplary embodiment;

DETAILED DESCRIPTION

Figure 1:
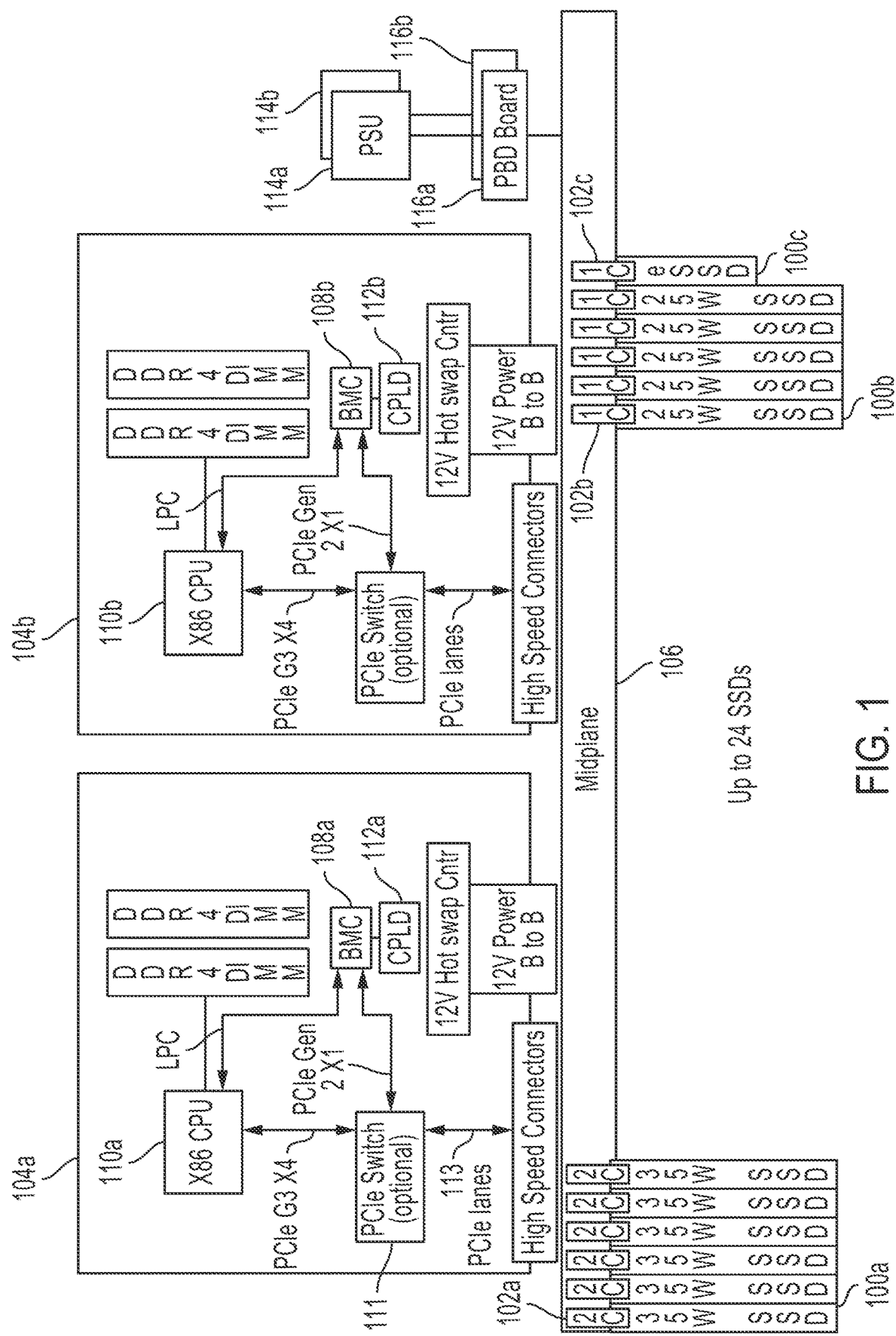
FIG. 1 is block diagram of a computer system configured for efficient power delivery to storage devices according to one exemplary embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

An Ethernet SSD (eSSD), including an NVMe-oF Ethernet SSD, may utilize an SSD connector such a, for example, a U.2 connector, to connect the SSD to a computer. The connection can be achieved via a mid-plane over the PCIe bus. In accordance with some specifications, U.2-based SSDs may support a maximum power consumption of about 25 W per device. Some scalable class of connectors can be used, such as a small-form-factor-technology-affiliate-100X (SFF-TA-100X) (where X is an integer value equal to 2, 6, 7, or 8) as an SSD connector. These scalable connectors can permit relatively higher data transactions than U.2 connectors, and thus, can be used as a next generation of SSD and/or input-output (IO) connector standard (e.g., used in association with some standards including, but not limited to, PCIe gen5 and beyond). In addition, these scalable connectors may support different power budgets depending on the type of connector that is used.

Due to different power configurations of SFF-TA-100X based systems, what is needed is a system and method for detecting and determining the power budget of an installed SSD device that utilizes a scalable connector such as, for example, the SFF-TA-100X connector, for efficiently distributing the power to the installed device based on its power requirements.

In general terms, embodiments of the present disclosure are directed to determining the power requirement of a storage device that connects to a host device via a scalable connector, such as, for example, the SFF-TA-100X connector. Taking SFF-TA-1002 as a specific example, under some specifications, there may be three connector types for SFF-TA-1002: 1) a 56 pin or "1C" connector receptacle supporting four (4) transmit (Tx) and receive (Rx) PCIe lanes; 2) an 84 pin or "2C" receptacle supporting eight (8) Tx and Rx PCIe lanes; and 3) a 140 pin or "4C" receptacle supporting sixteen (16) Tx and Rx PCIe lanes. Embodiments of the present disclosure are not limited to these connector types or to the SFF-TA-100X connector, and may extend to other connector types and other scalable connectors.

The power that may be required by a storage device that uses a scalable connector may depend on the connector type that is used. For example, a "1C" connector may require about 25 W of power, a "2C" connector may require about 35 W of power, and a "4C" connector may require about 70 W of power. According to some power distribution mechanisms, power used by the storage devices may be generally supplied from a single power source unit (PSU). According to such traditional mechanisms, the single PSU may generally over-provision power for the worst-case scenario. That is, according to some power distribution mechanisms, a single PSU can be configured to provide power to a computer system with the assumption that all slots of the system will have a storage device requiring maximum power installed. However, providing a power source that anticipates the worst-case scenario may be power and/or cost inefficient. In addition, using a single power source to provide power for all storage devices may prevent the power source from working at an optimal efficiency range.

One or more of the above identified deficiencies may be addressed via certain embodiments of the present disclosure that provision power based on the type of connectors used by the storage devices, instead of over-provisioning for maximum power per slot inside a chassis. According to one embodiment, the disclosed systems can determine the type of connector used by the storage device by identifying signals transmitted via one or more pins of the installed connector. These pins may be, for example, presence pins that may be reserved for transmitting different types of presence signals depending on the connector type. According to the SFF-TA-1009 specification, for example, presence detection signals are transmitted via PRSNT # pins. For example, the "1C" (x4) connector utilizes one presence signal (e.g. PRSNT0 #); the "2C" connector (x8) connector utilizes a second presence signal (e.g. PRSNT1 #), and the "4C" (x16) connector utilizes a third presence signal (PRSNT2 #). By determining the number of presence pins that are asserted (e.g. asserted low), the disclosed systems can determine the connector type of device, and hence, its maximum power requirement.

In addition, embodiments of the present disclosure also provide cost and power efficiency enhancements to how power is delivered to the storage devices. In one exemplary embodiment, the computer system includes two or more power source units that may be enabled at the same time to share the power distribution responsibility for the system. The number of power source units that are enabled at a particular time may depend, for example, on the total power consumed by the system, amount of default power each PSU is configured to deliver, and/or the like. In certain scenarios, use of two or more power sources may allow the power sources to operate more efficiently than using a single big power source. For example, in mid- to heavily-populated systems where the total power demand might be high, using two power sources may allow each power source to operate at over 90% efficiency. Not only is there efficiencies in terms of performance, but by using multiple smaller PSUs to distribute power to the storage units, the power usage and associated cost of the smaller PSUs may also be decreased.

FIG. 1 is block diagram of a computer system configured for efficient power delivery according to one exemplary embodiment. The system may include one or more storage devices 100a-100c (collectively referenced as 100) having one or more scalable connectors 102a-102c that are used to interface with one or more control boards (e.g. motherboards) 104a, 104b (collectively referenced as 104) via a mid-plane 106. In one example, up to 24 storage devices may be installed on the computer system in the provided slots. A person of skill in the art should recognize that more or less storage devices may also be supported.

In one example, the scalable connector 102 may include a SFF-TA-100X connector, where X is an integer value equal to 2, 6, 7, or 8. The power budget for the scalable connector may depend on the size of the connector receptacle and the number of PCIe lanes that it supports. Taking the SFF-TA-1008 connector as an example, the different sizes of an SFF-TA-1008-SSD (e.g., FPGA+SSD connected to the SFF-TA-1008 connector) are about 7.5×76×104.9 mm that supports up to about 25 W, 7.5×76×142.2 mm that supports up to about 35 W, about 16.8×76×104.9 mm that supports up to about 70 W, and about 16.8×76×142.2 mm that supports up to about 70 W. An SFF-TA-1008-SSD supports SFF-TA-1002 1C, 2C, and/or 4C (e.g., PCIe x4-x16). An SFF-TA-1008 SSD supports PCIe gen 5 up to 32 GT/s, 802.3 to 112 GT/s. An SFF-TA-1008-SSD has high-capacity and/or high-density NVMe form factor. For example, the about 7.5 mm form factor SFF-TA-1008-SSD (e.g., about 7.5×76×104.9 mm that supports up to about 25 W, about 7.5×76×142.2 mm that supports up to about 35 W) supports up to 48 modules, for example, about 104.9 up to 24 14×18 mm packages per module (576/U) or about 142.2 up to 48 14×18 mm packages per module (960/U). For example, the about 16.8 mm form factor SFF-TA-1008-SSD (e.g., about 16.8×76×104.9 mm that supports up to about 70 W and about 16.8×76×142.2 mm that supports up to about 70 W) supports up to 24 modules or up to 48 about 14×18 mm flash packages per module (960/U).

According to one embodiment, one or more of the different sizes of scalable connectors may be used for the various storage devices 100a, 100b, 100c that are installed in the computer system. For example, both the "1C" and "2C" connector types, respectively requiring about 25 W and about 35 W of power, may be used. The type of storage devices connected to the different connectors may also vary, and may include, for example, SSDs, eSSDs, and/or the like.

According to one embodiment, each scalable connector 102 includes one or more presence pins for transmitting presence signals. Taking SFF-TA-1009 connectors as an example, PRSNT[0 . . . 2]# signals may be transmitted depending on the type of connector that is used. In one embodiment, a different number of presence pins are asserted (e.g. asserted low) depending on the connector type. For example, a first connector type of a first size may assert a first presence pin, a second connector type of a second size may assert a second presence pin in addition to the first pin, and a third connector type of a third size may assert a third presence pin in addition to the first and second pins. The total number of possible presence pins that may be provided by a scalable connector may be depend on the total number of different connector types that may need to be identified.

In one embodiment, each control board includes a processor, such as, for example, a baseboard management controller (BMC) 108a, 108b (collectively referenced as 108), for monitoring a state of the computer system and performing management tasks for the storage devices 100. For example, the BMC may be configured to monitor supply of power to the system, monitor insertion/removal of storage devices, and/or the like. Although BMC is used as an example of a processor that may be used, a person of skill in the art should recognize that the monitoring may also be carried out by a host central processor unit (CPU) 110a, 110b (collectively referenced as 110), and/or the like.

In one embodiment, the BMC 108 is coupled to the storage devices via a switch 111 such as, for example, a PCIe or SMBus (system management bus) switch. Communication between the BMC 108/CPU 110 and the storage devices may occur via the switch 111 over one or more communication lanes 113 such as, for example, PCIe lanes.

In one embodiment, the BMC 108 can be coupled to a complex programmable logic device (CPLD) 112a, 112b (collectively referenced as 112) via a general purpose input output (GPIO). In one embodiment, the CPLD 112 is coupled to the presence pins and other sideband signals of the scalable connectors 102 at the various slots of the computer system. The sideband signals may identify a type of storage device. In one embodiment, the CPLD 112 reads the presence signals from the various slots, and provides them to the BMC 108 upon request.

In one embodiment, the computer system further includes two or more PSUs 114a, 114b (collectively referenced as 114) coupled to two or more power distribution boards 116a, 116b. According to one embodiment, a first one of the PSUs 114a may be enabled for providing a default power (e.g. enabled for about 25 W by default) to the various storage devices 100 installed in the various slots. A second one of the PSUs 112b may be enabled by the BMC 108 or CPU 110 based on power need and/or efficiency considerations of the system. For example, a single PSU delivering about 700 W of total power may work at an efficiency range of around 88%. However, if two PSUs are enabled so that each provides about 350 W of power, each PSU may be operated at around 92% efficiency range. In one embodiment, the BMC can use such efficiency information in determining whether to enable the second PSU 112b or not, even if the first PSU 112a may have sufficient power to satisfy the power demands of the system.

Figure 2:
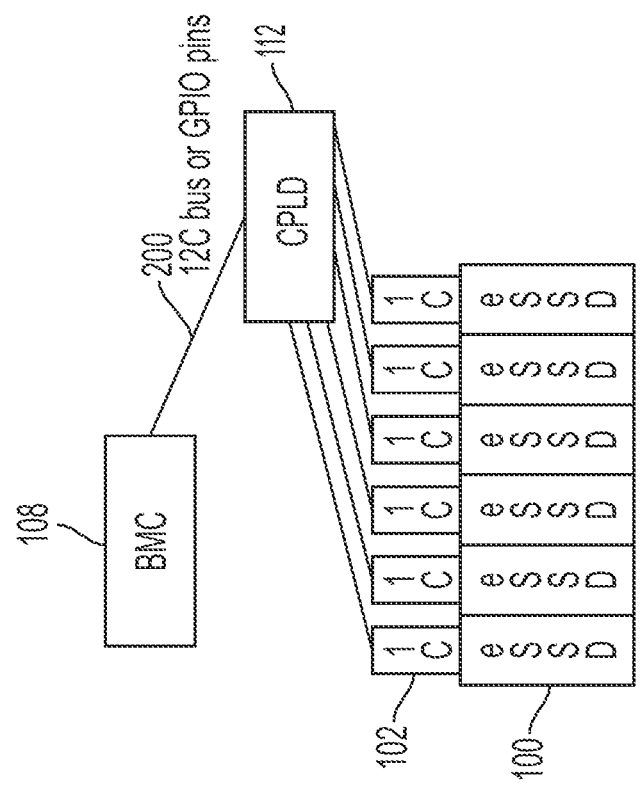
FIG. 2 is a more detailed block diagram of a complex programmable logic device coupled to multiple slots of the system according to one exemplary embodiment.

FIG. 2 is a more detailed block diagram of the CPLD 112 coupled to multiple slots of the system according to one exemplary embodiment. In one embodiment, the BMC 108 can be configured to communicate with the CPLD 112 via a GPIO 200 for requesting and receiving status of presence pins in particular slots of the system. As depicted in the embodiment of FIG. 2, the CPLD 112 is coupled to the presence pins at multiple slots of the system. In this manner, the CPLD 112 may concurrently obtain presence data of connectors in the multiple slots in embodiments where the BMC 108 may not itself obtain such concurrent data, for example, due to lack of a sufficient number of pins that can connect to the multiple slots.

In one embodiment, the BMC 108 communicates with the CPLD 112 to assess a power need at particular slot of the system. This may occur, for example, upon detecting insertion of a storage device at the particular slot. In one embodiment, the BMC 108 transmits a request to the CPLD 112 identifying the slot of interest. In response, the CPLD 112 returns, via the GPIO register, status of the pins at the requested slot. The BMC 108 reads the GPIO register for determining the number of presence pins that have been asserted (e.g. asserted low). In one embodiment, the disclosed systems can determine and use a power table that correlates the different number of asserted pins, to different power requirements. The BMC 108 may determine a power need at a particular slot via a lookup of the power table.

FIG. 3 is conceptual layout diagram of a power table 300 according to one exemplary embodiment. The table includes a plurality of presence signals 302 correlated to corresponding power requirements 304. For example, for the different types of SFF-TA-1009 connectors, the power table correlates PRSNT[0]# signal to 25 W, PRSNT[1]# signal to about 35 W, and PRSNT[2]# signal to about 70 W.

Figure 4:
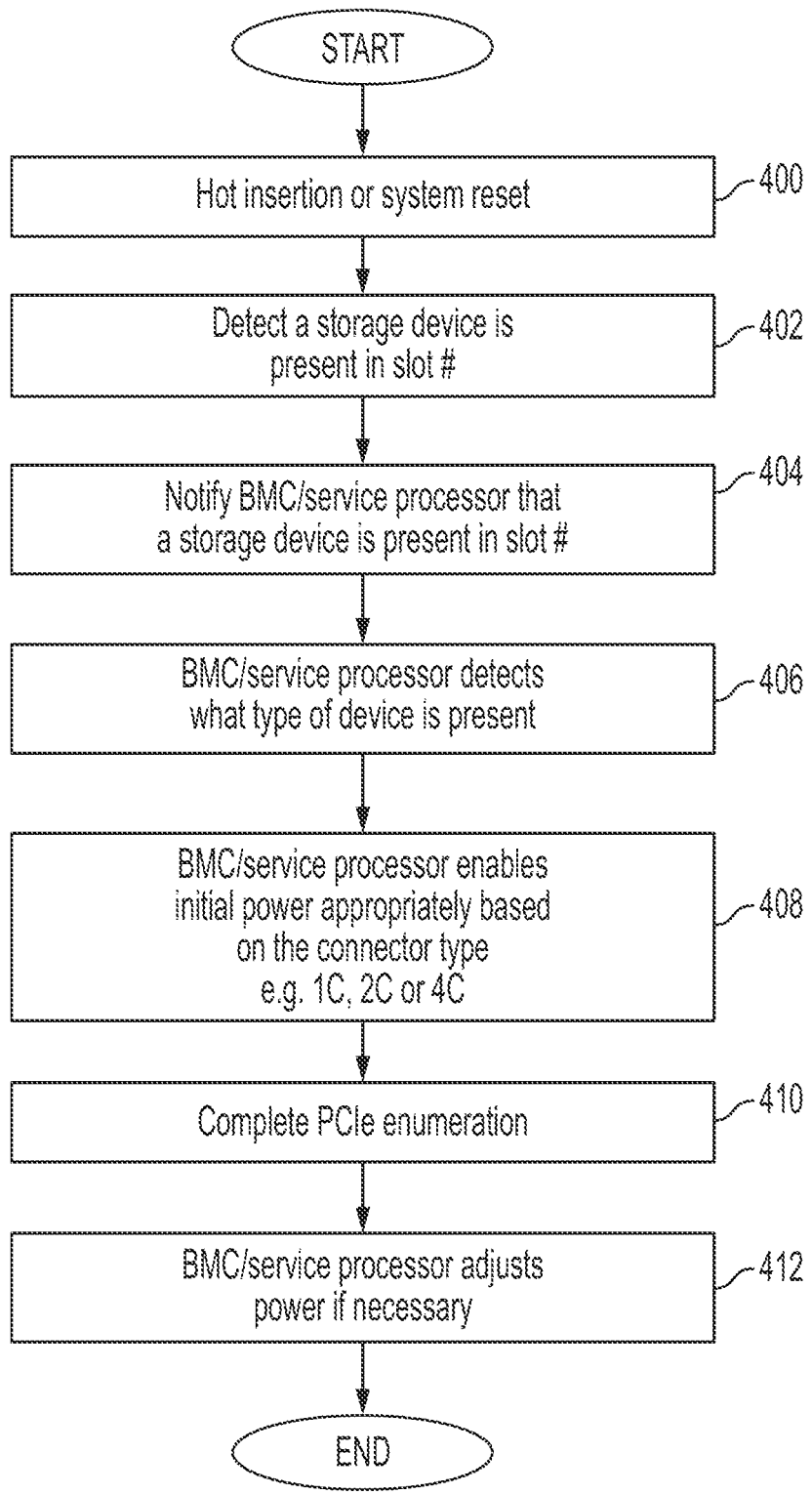
FIG. 4 is a flow diagram of a process for detecting the power requirement of one or more storage systems according to one exemplary embodiment.

FIG. 4 is a flow diagram of a process for detecting the power requirement of one or more storage systems according to one exemplary embodiment. The process starts, and in act 400, a particular storage device 100 is inserted into an available slot of the computer system without stopping or shutting down the system, or the computer system is reset. In response to such actions, a storage device present at a particular slot number is detected in act 402.

In act 404, a signal is transmitted by the storage device to the BMC 108 for indicating presence of the storage device at the particular slot number.

In act 406, the BMC 108 communicates with the CPLD 112 for determining the type of connector 102 that is attached to the storage device in the particular slot. In this regard, the BMC 108 transmits a query to the CPLD for status of presence pins at the particular slot. In response to the query, the CPLD provides the presence signal read from the presence pins at the requested slot. In one embodiment, the BMC determines the type of connector based on the returned presence signal.

In some embodiments, instead of the CPLD collecting presence signals from the multiple slots and providing them to the BMC upon request, the BMC 108 may obtain information on the connector type by querying the storage device itself. The query may be performed, for example, via a system management or I2C bus. According to one embodiment, the query of information via the bus occurs one storage device at a time. Thus, when information on connector types is to be obtained from multiple slots, the serial transmissions of queries via the system management or IC bus may be slower than using the CPLD 112 which, according to one embodiment, concurrently collects presence signals for multiple storage devices from multiple slots of the system.

Assuming that the BMC 108 queries and obtains presence signals from the CPLD 112, the BMC, in act 408, performs a lookup of the power table 300 for the obtained presence signal. Based on the power indicated in the power table for the queried presence signal, the BMC enables initial delivery of the power to the storage device via one or more PSUs 114.

In act 410, the BMC 108 completes PCIe enumeration for determining actual power budget of the computer system. In one embodiment, PCIe enumeration identifies the storage device that is actually connected to the midplane 106 via the connector 102. For example, although the connector 102 identified in act 406 may be a "3C" connector, the form factor of storage device connected to the connector may be that of a "1C" or "2C" storage device.

In act 412, the BMC 108 adjusts power delivery as needed. In one embodiment, the BMC 108 adjusts power based on the identified form factor of the storage device connected to a connector. Taking the above example where a "1C" or "2C" storage device is connected via a "3C" connector, the BMC 108 may adjust the power delivery to correspond to a "1C" or "2C" connector instead of the "3C" connector.

Figure 5:
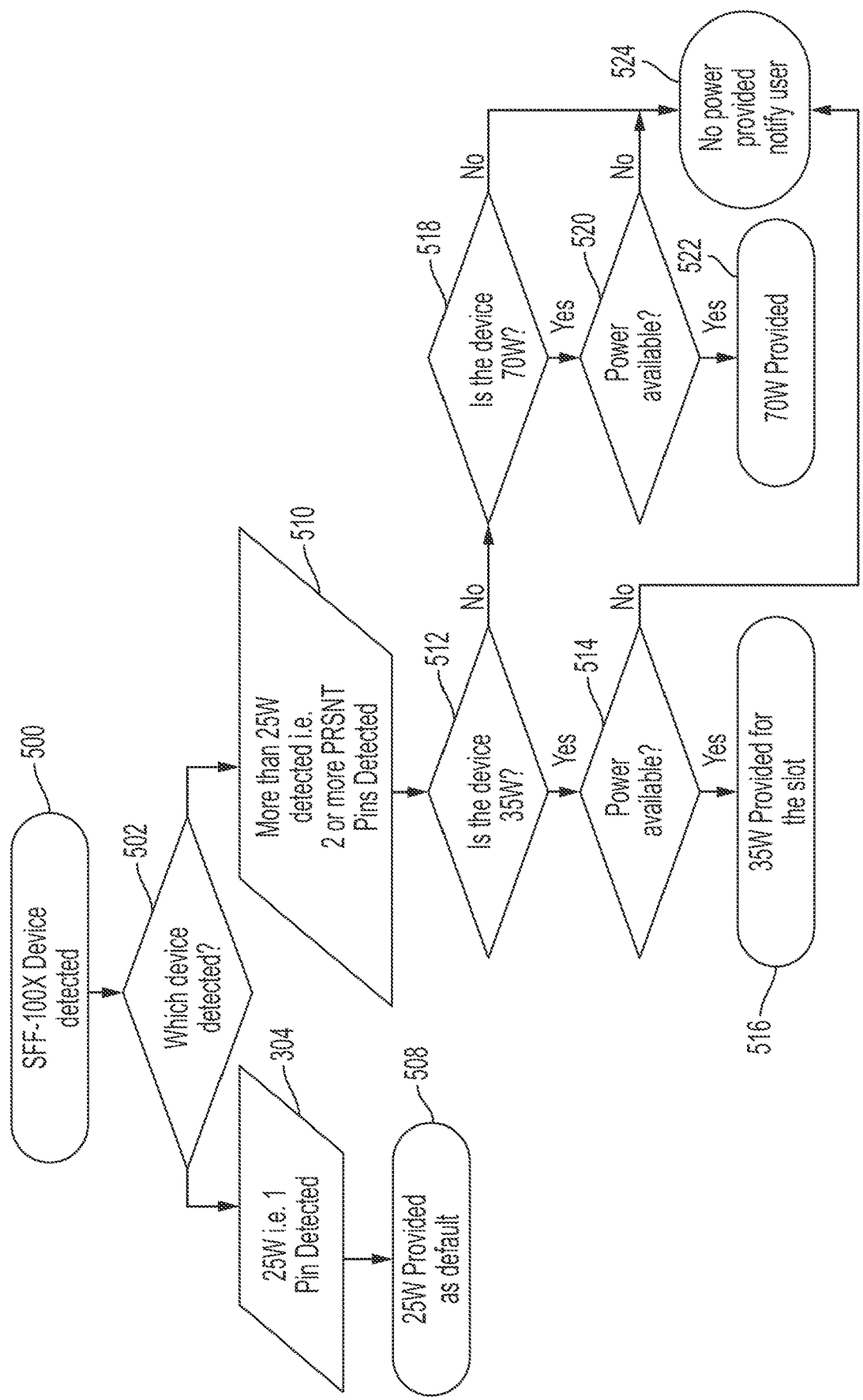
FIG. 5 is a flow diagram of a process for delivering appropriate power to a storage device connected via a scalable connector according to one exemplary embodiment.

FIG. 5 is a flow diagram of a process for delivering appropriate power to a storage device 100 connected via a scalable connector 102 according to one exemplary embodiment. It is assumed, for sake of simplicity, that the storage device in FIG. 5 is an SFF-TA-100X storage device, and that the possible types of connectors for such a device are the "1C," "2C," and "3C" connectors using respectively about 25 W, about 35 W, and about 70 W of power.

In act 500, the BMC 108 detects the SFF-TA-100X storage device at a particular slot.

In act 502, a determination is made as to the particular type of SFF-TA-100X device that is detected. If a determination is made in act 504 that a 25 W ("1C") device has been detected (e.g. by detecting a first presence signal), 25 W of power is provided to the slot hosting the device in act 508. In the event that the first PSU 114*a* is enabled to provide 25 W of power by default, the BMC 108 refrains from activating the remaining other PSUs 114*b*.

If a determination is made in act 510 that a device requiring more than 25 W of power (e.g. "2C" or "3C" connector types) is detected (e.g. by detecting second and third presence signals), a determination is made in act 512 as to whether the device is a 35 W ("2C") device. If the answer is YES, a determination is made in act 514 as to whether 35 W of power is available from the one or more PSUs 114. If the answer is YES, the BMC transmits, in act 516, a signal to the one or more PSUs 114 for delivering 35 W of power to the slot in which the device is installed. For example, if the first PSU 114*a* is enabled to provide 25 W of power by default, the BMC transmits a signal to the second PSU 114*b* for providing the remaining 10 W of power to the slot. According to this example, if the second PSU 114*b* is also enabled to provide 25 W of power by default, the missing 10 W of power is consumed by the device, and the 15 W of unused power may be used, for instance, to accelerate tasks of a processor embedded in the storage device 100.

In one embodiment, the BMC 108 can determine total power consumption by the installed storage devices to determine whether power is to be delivered by a single or multiple PSUs. For example, if using one PSU to supply the power needed by all storage devices allows the PSU to function in an efficiency range greater than a minimum efficiency range (e.g. about 88% of greater), the BMC 108 may refrain from activating more than one PSU. This may occur, for example, in a lightly populated system where total power consumption is below a threshold amount (e.g. below about 700 W). For a medium to densely populated system where the total power consumption is above the threshold amount, enabling both the first and second PSUs to distribute power may allow each PSU to operate at a higher efficiency range than distributing the power via a single PSU. In addition, using PSUs with smaller power capacities may be more cost efficient in terms of price when compared to a single bigger PSU.

If a determination is made in act 518 that the device is an about 70 W ("3C") device, a determination is made in act 520 as to whether about 70 W of power is available from the one or more PSUs 114. If the answer is YES, the BMC 108 transmits, in act 522, a signal to the one or more PSUs 114 for delivering about 70 W of power to the slot in which the device is installed. If, however, no such power is available, no power is provided in act 524, and a notification is provided to a user indicating, for example, that no power can be provided.

Figure 6:
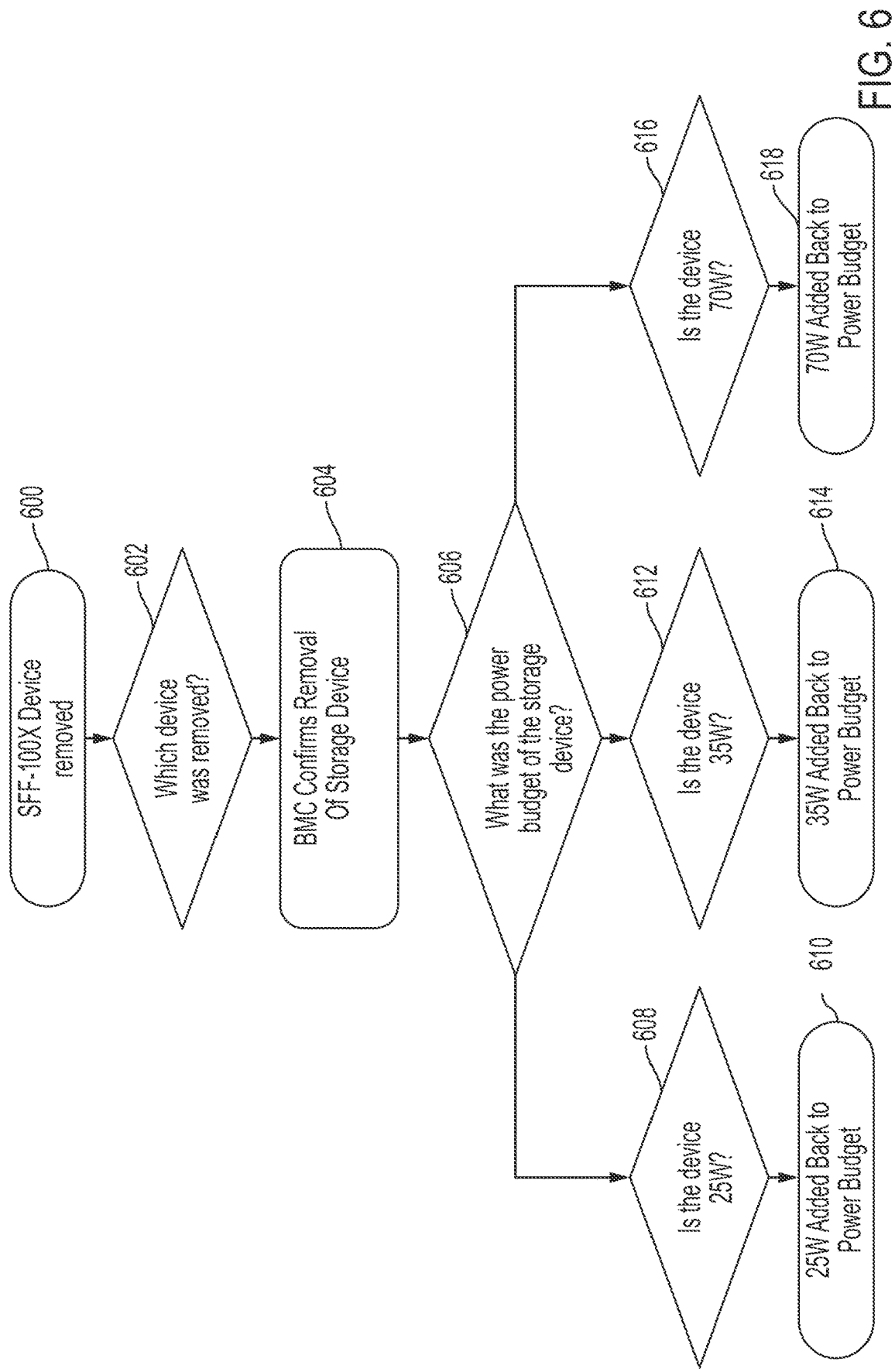
FIG. 6 is a flow diagram of a process for power de-allocation in response detecting a removal of a storage device according to one exemplary embodiment.

FIG. 6 is a flow diagram of a process for adjusting a power budget in response detecting removal of a storage device 100 according to one exemplary embodiment. It is assumed, for sake of simplicity, that the storage device in FIG. 6 is an SFF-TA-100X storage device, and that the possible types of connectors for such a device are the "1C," "2C," and "3C" connectors respectively using about 25 W, about 35 W, and about 70 W of power.

In act 600, the BMC 108 detects removal of the SFF-TA-100X storage device from a particular slot.

In act 602, a determination is made as to the scalable connector type of the storage device that is removed. In one embodiment, the BMC is aware of the storage device that is installed in a slot as the BMC periodically polls for this type of information. In some embodiments, an interrupt signal at a particular slot may indicate to the BMC that a device is being removed.

In act 604, the BMC confirms that the storage device has been removed. This may be done, for example, by confirming that no presence pins are detected.

In act 606, a determination is made as to the power budget of the removed storage device. This may be done, for example, by querying the CPLD 112 as to the asserted presence pins of the storage device in the particular slot.

In act 608, a determination is made as to whether the removed device was a about 25 W ("1C") device. If the answer is YES, about 25 W are added back to the power budget in act 610.

In act 612, a determination is made as to whether the removed device was a 35 W ("2C") device. If the answer is YES, 35 W are added back to the power budget in act 614.

In act 616, a determination is made as to whether the removed device was a about 70 W ("3C") device. If the answer is YES, 70 W are added back to the power budget in act 618.

Figure 7A:
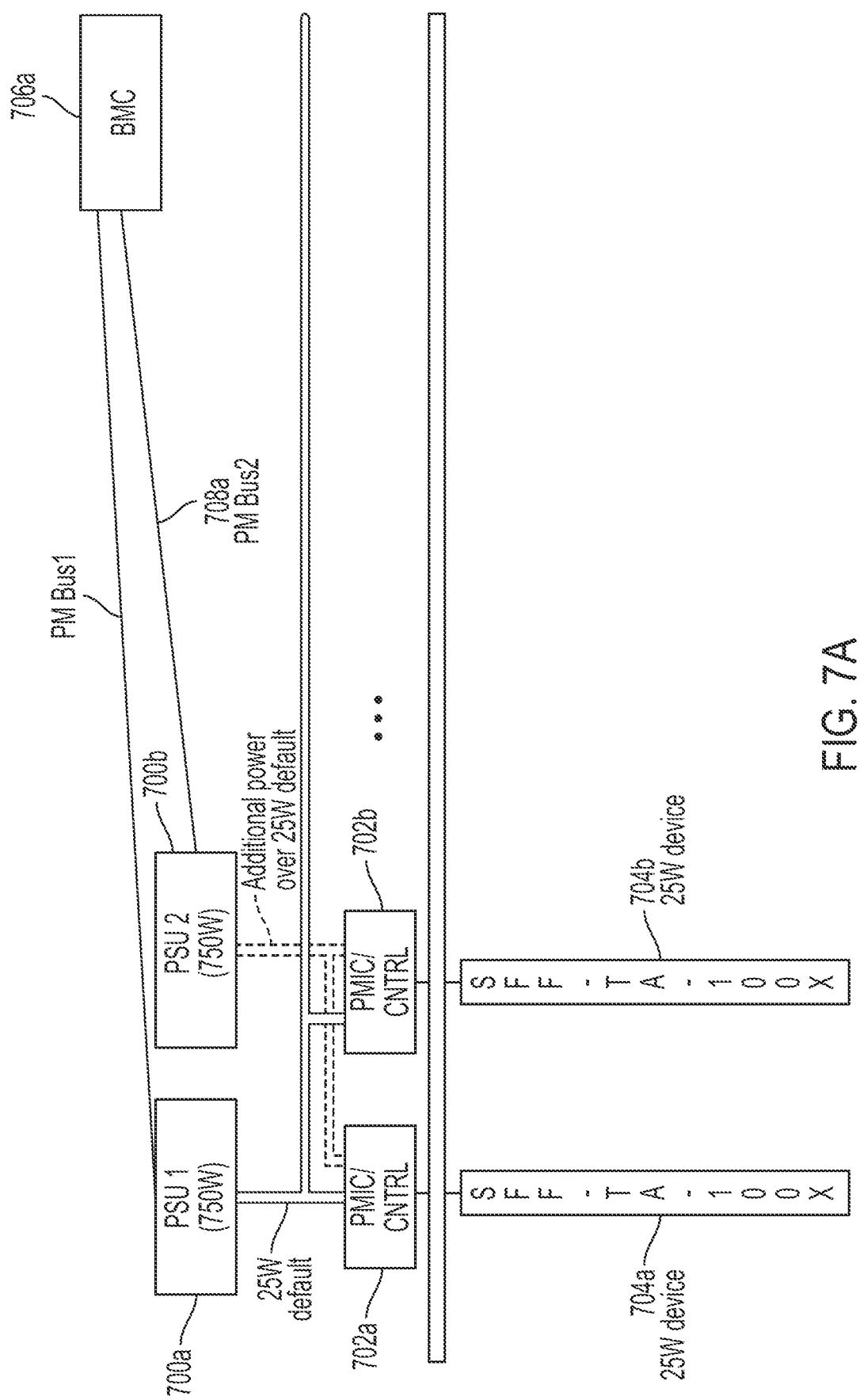
FIGS. 7A-7B are more detailed block diagrams of exemplary power supply units providing power to a computer system according to one exemplary embodiment.
Figure 7B:
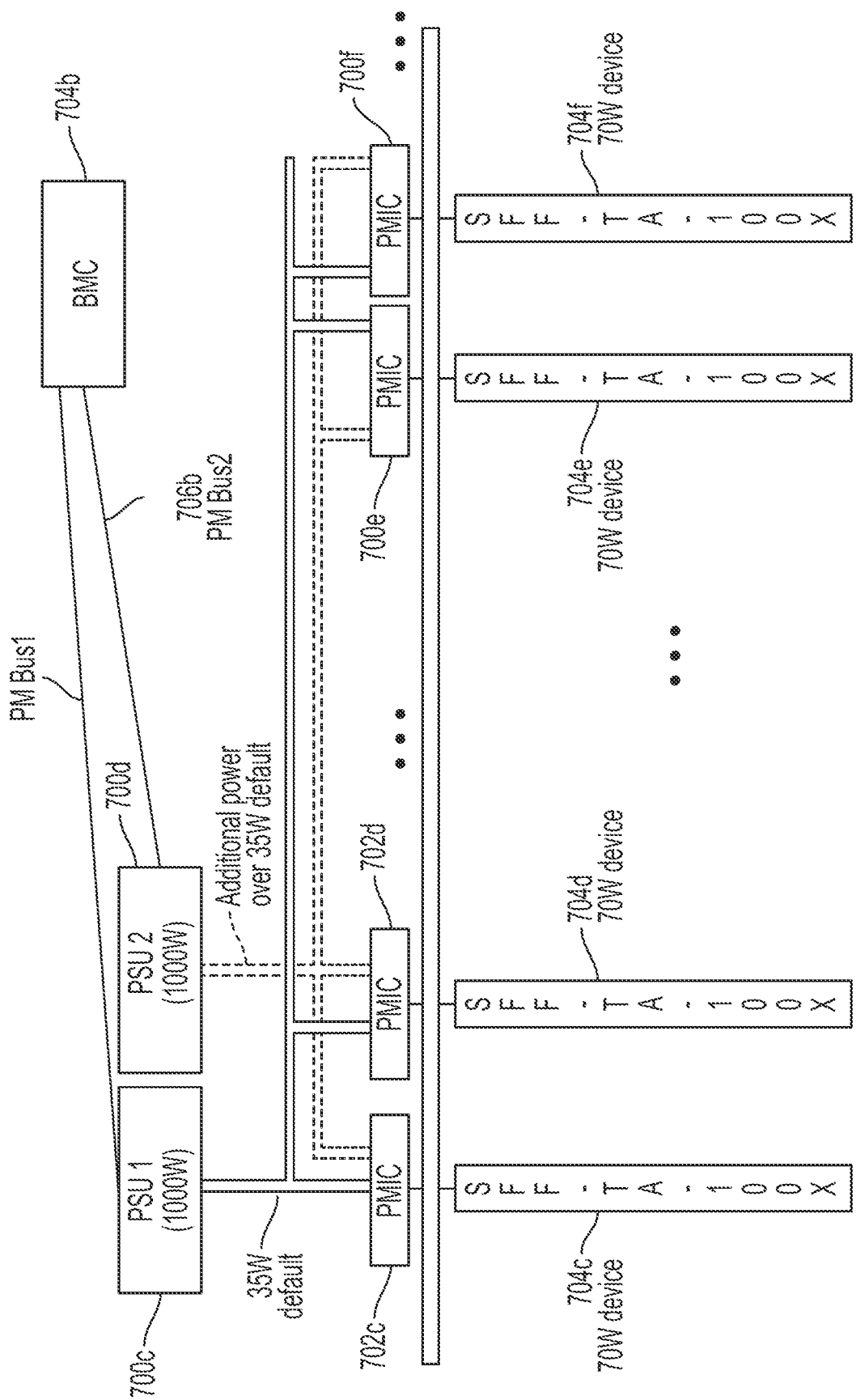

FIGS. 7A-7B are more detailed block diagrams of exemplary PSUs providing power to a computer system (e.g. the computer system of FIG. 1), according to one exemplary embodiment. The computer system of FIG. 7A includes first and second PSUs 700a, 700b which may be similar to the PSUs 114 of FIG. 1. In one example, the first and second PSUs 700a, 700b are both configured to provide about 750 W of total power.

Power may be delivered to a storage device in a slot via a power management interface circuit (PMIC) 702a, 702b. In one example, the first and second PSUs 700a, 700b are both configured to deliver about 25 W of power to a particular slot by default. In this case, a slot to which a scalable connector 704a, 704b (similar to the scalable connector 102 of FIG. 1) is connected may receive up to about 50 W of power via the corresponding PMIC 702a, 702b. Assuming, in this example, that the scalable connectors 704a, 704b are ones requiring about 25 W of power (e.g. "1C" connector types), the first PSU 700a may, in one embodiment, assume the responsibility of delivering the required power to the multiple storage devices connected to the scalable connectors 704a, 704b. In this regard, a BMC 706a (which may be similar to the BMC 108 of FIG. 1), may be configured to transmit a signal via, for example, bus 708a, to place the second PSU 700b in the standby/sleep mode.

In one embodiment, even if the first PSU 700a may alone be deemed to be sufficient to provide power to the connected devices of the system, the second PSU 700b may nonetheless be enabled to provide power, along with the first PSU 700a, if having both PSUs enabled, for example, causes each individual PSU 700a, 700b to achieve a higher efficiency range than what would be achieved by a single PSU. For example, if a total power consumption by the storage devices is about 700 W, the efficiency range of a single PSU (e.g. PSU 700a) working by itself to deliver the about 700 W of power may be about 88%. In this case, the BMC 706a may be configured to enable both the first and second PSUs 700a, 700b so that each delivers about 350 W of power. Experiments show that each PSU 700a, 700b may be operated at around about 92% efficiency range at a about 350 W load.

In FIG. 2B, the computer system includes first and second PSUs 700c, 700d which may be similar to the PSUs 114 of FIG. 1. In one example, the first and second PSUs 700c, 700d are both configured to provide about 1000 W of total power, with each PSU 700c, 700d being configured to deliver about 35 W of power to a slot by default.

The example computer system of FIG. 2B also includes scalable connectors 704c-704f each requiring about 70 W of power. Given that the first PSU 700c may be responsible for delivering about 35 W to each slot by default, a BMC 704b (which may be similar to the BMC 108 of FIG. 1), may be configured to send a signal to the second PSU 700d for delivering the remaining about 35 W to the slots via the corresponding PMIC 702c-702d. In this manner, the storage devices connected to the scalable connectors 704c-704f receive the required about 70 W of power.

Although for simplicity purposes the power to the computer system in the above examples is described as being delivered by two PSUs, a person of skill in the art should recognize that more than two PSUs may enabled/active at the same time, and invoked to provide power to the computer system.

In some embodiments, the BMC 108 discussed above, is implemented in one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for power distribution to storage devices have been specifically described and illustrated herein, many modifications and variations will be apparent to those skilled in the art. Accordingly, it is to be understood that a system and method for power distribution constructed according to principles of this disclosure may be embodied other than as specifically described herein. The disclosure is also defined in the following claims, and equivalents thereof.

What is claimed is:

1. A method for power distribution comprising:
   detecting, by a processor, a storage device having an interface, the interface for transferring data to the storage device;
   determining, by the processor, a power requirement of the storage device based on a signal from the interface;
   transmitting a first signal to a power supply unit for providing a first amount of power to the storage device;
   comparing the first amount of power to the power requirement; and
   transmitting, based on the comparing, a second signal for providing a second amount of power to the storage device.

2. The method of claim 1, wherein the interface comprises a connector having a predetermined form factor.

3. The method of claim 1, wherein the storage device comprises at least one of a solid state drive (SDD) or a network-attached SSD.

4. The method of claim 1, wherein the determining of the power requirement includes:
   determining a type of signal from the interface; and
   searching a data structure for determining the power requirement based on the type of signal.

5. The method of claim 4, wherein the data structure comprises a table associating one or more signal types to corresponding power requirements.

6. The method of claim 4, wherein the type of signal comprises at least one of a first presence signal, second presence signal, or third presence signal.

7. The method of claim 6, wherein the first presence signal, the second presence signal, or the third presence signal is based on a type of interface.

8. The method of claim 7, wherein a first type of interface has a first power requirement, and a second type of interface has a second power requirement different from the first power requirement.

9. The method of claim 6, wherein the determining the type of signal includes determining a status of one or more pins of the interface.

10. The method of claim 1, wherein the second amount of power is provided by a second power supply unit, the method further comprising:
    activating, by the processor, based on the comparing, the second power supply unit for delivering power to the storage device.

11. A power distribution system comprising:
    a storage device having an interface, the interface for transferring data between a host device and the storage device;
    a power supply unit configured to provide a first amount of power; and
    a processor coupled to the storage device and the power supply unit, the processor being configured to:
    detect the storage device having the interface;
    determine power requirement of the storage device based on a signal from the interface;
    transmit a first signal to the power supply unit for providing a first amount of power to the storage device;
    compare the first amount of power to the power requirement; and
    transmit, based on the instructions that cause the processor to compare, a second signal for providing a second amount of power to the storage device.

12. The system of claim 11, wherein the interface comprises a connector having a predetermined form factor.

13. The system of claim 11, wherein the storage device comprises at least one of a solid state drive (SDD) or a network-attached SSD.

14. The system of claim 11, wherein the instructions that cause the processor to determine the power requirement include instructions that cause the processor to:
  determine a type of signal from the interface; and
  search a data structure for determining the power requirement based on the type of signal.

15. The system of claim 14, wherein the data structure comprises a table associating one or more signal types to corresponding power requirements.

16. The system of claim 14, wherein the type of signal comprises at least one of a first presence signal, second presence signal, or third presence signal.

17. The system of claim 16, wherein the first presence signal, the second presence signal, or the third presence signal is based on a type of interface.

18. The system of claim 17, wherein a first type of interface has a first power requirement, and a second type of interface has a second power requirement different from the first power requirement.

19. The system of claim 16, wherein the instructions that cause the processor to determine the type of signal instructions that cause the processor to determine a status of one or more pins of the interface.

20. The system of claim 11 further comprising a second power supply unit, wherein the processor is further configured to:
  activate, based on the instructions that cause the processor to compare, the second power supply unit for delivering power to the storage device.

* * * * *